United States Patent [19]
Robinson, Jr.

[11] Patent Number: 5,737,230
[45] Date of Patent: Apr. 7, 1998

[54] APPARATUS AND PROCESS FOR SLAB SAMPLING OF CUSTOMIZED BRICK

[75] Inventor: George Robinson, Jr., Denver, Colo.

[73] Assignee: Robinson Brick Company, Denver, Colo.

[21] Appl. No.: 505,742

[22] Filed: Jul. 24, 1995

[51] Int. Cl.⁶ .................................................. G06F 19/00
[52] U.S. Cl. ........................ 364/469.01; 364/475.01; 364/477.01
[58] Field of Search ................ 364/468.01–477.06; 434/74; 264/71, 245, 256, 309, 219, 64; 425/104, 301

[56] References Cited

U.S. PATENT DOCUMENTS

| | | |
|---|---|---|
| 3,621,086 | 11/1971 | Gulde ................................ 264/71 |
| 3,939,238 | 2/1976 | Salts ................................ 264/71 |
| 4,183,188 | 1/1980 | Goldsby .......................... 52/596 |
| 4,258,599 | 3/1981 | Keck ................................ 83/112 |
| 4,263,240 | 4/1981 | Postell, Jr. ..................... 264/71 |
| 4,278,631 | 7/1981 | Salviati .......................... 264/64 |
| 4,311,073 | 1/1982 | Brugger et al. . |
| 4,419,065 | 12/1983 | Cox ................................ 425/301 |
| 5,183,616 | 2/1993 | Hedrick ......................... 264/219 |
| 5,568,391 | 10/1996 | McKee ........................ 364/469.01 |

Primary Examiner—Reba I. Elmore
Assistant Examiner—Steven R. Garland
Attorney, Agent, or Firm—Sheridan Ross, P.C.

[57] ABSTRACT

An apparatus and process for the production of brick slabs. Information regarding the desired color and texture of brick slab samples is used to enable rapid production and transmission of brick slab samples having the desired characteristics.

23 Claims, 4 Drawing Sheets

APPARATUS AND PROCESS FOR SLAB SAMPLING OF CUSTOMIZED BRICK

FIELD OF THE INVENTION

This invention relates to a process for production of sample brick slabs and, more specifically, to the rapid production of sample brick slabs having specific color and texture characteristics selected by a potential customer.

BACKGROUND OF THE INVENTION

The use of bricks having a particular appearance in construction to create a desired appearance of the resulting structure is a long standing practice. An architect or designer may select or specify certain types of brick for use in construction in an effort to determine the appearance of a structure. Typically, a brick type may be specified by a reference to a particular sample provided by a brick producer. Due to the limitations of currently available two-dimensional representations, such as photographs, of the appearance of a brick type, it is advantageous to view actual samples of the brick to verify that the actual brick has the desired appearance. Such samples may be a stack of finished brick, or brick slabs affixed to a panel. Such brick slabs are typically produced by sawing full, completed bricks to separate a portion of the brick having an exposed surface to create a slab approximately one-half to one inch thick.

However, as the number of brick types which may be produced increases, it becomes less practical for a potential customer to retain actual samples of all of the various brick types which are available. While sample collections may be available, for example at a central sales location of a brick producer, travel to such a location may be inconvenient and time consuming. Furthermore, production of slab samples by sawing complete bricks is time consuming due to the length of time typically necessary to dry and fire complete bricks.

Accordingly, a means for providing actual brick samples to locations removed from the brick producer in a timely manner would be highly desirable.

SUMMARY OF THE INVENTION

It is an object of the present invention to provide a process for rapidly producing sample brick slabs.

In one embodiment of the invention, the raw materials necessary for the production of a type of brick are identified and mixed together. The raw mixture is then extruded through an extrusion die into a column having a rectangular cross section, which is cut into slugs and then cut into individual bricks. Prior to the cutting of the column into slugs, a slab column is formed by a slab cutter, comprising a horizontal wire positioned below the upper surface of the column and perpendicular to the direction of travel of the column. The passage of the column past the slab cutter separates the column into a slab column portion and carrier column portion. The carrier column portion supports the slab column portion through the subsequent cutting operations, after which the slab portion of each brick is separated from the carrier portion of the brick. The slab portions are then rapidly dried, fired and packaged for shipment.

Another object of the invention is to provide a process for rapidly changing from production of full size bricks to production of slab samples and back to production of full size brick using some of the same equipment.

In one embodiment of the invention, the parameters relating to the production of full size brick are recorded prior to interrupting production of the full size brick to begin production of slab samples. After producing slab samples, the production apparatus may rapidly be returned to production of full size brick by reference to the recorded parameters.

It is a further object of the invention to provide a process for producing sample brick slabs which incorporate color and texture parameters selected by a potential customer.

In one embodiment of the invention, a potential customer selects a desired combination of color and texture for the brick slab samples. The color of the resulting samples may be determined by selection of raw materials, by application of liquid coatings to the surfaces of extruded material, by application of solid materials to the surfaces of extruded material, or by combinations of the foregoing. The color selected by the potential customer is therefore produced by the selection of appropriate raw materials and the application of appropriate solid and liquid materials and coatings to the surfaces of the extruded material. Similarly, the texture of the brick slab samples may be determined by various means, such as the use of rollers, drags, sweeps and cutters contacting the surface of the extruded material to deform the surfaces of the extruded shape in a manner corresponding to the selected texture. In addition, the texture of the brick slab samples may be altered by post-firing activity, such as by tumbling to produce a texture similar to that of used brick.

It is a another object of the invention to control the appearance of sample brick slabs to allow the appearance of the sample slabs to be consistent with full bricks of the type the sample brick slabs are intended to represent.

In another embodiment of the invention, the various parameters which influence the final appearance of the sample brick slabs, such as the portions of the ingredients, the means and method of texturing, the means and methods of applying coatings and depositing solid material, the liquid coatings used and the solid materials deposited, are controlled during production and recorded. Control of the appearance of the slab samples is facilitated by inspection of the samples and comparison of the slab samples to the selected color and texture information and to reference samples under controlled inspection conditions. The recorded parameters used in connection with the production of the brick slab samples may also be used as reference parameters in the production of corresponding full size brick to provide consistency in the appearance of the samples and the full size brick.

It is yet another object of the invention to provide potential customers with a means to identify and select available types of bricks and to produce slab samples corresponding to the selected brick types.

In one embodiment of the invention, a potential customer is provided with means for displaying and selecting brick color and texture information, such as a computer controlled color video display and an input device. Using the input device, a potential customer may alter the display, select desired color and texture parameters, and transmit a request for slab samples corresponding to the selected parameters to a brick producer.

It is yet another object of the invention to provide brick sample slabs to potential customers under conditions which increase the likelihood that the potential customers will specify the use of brick represented by the sample slabs.

It is a further object of the invention to permit the production of relatively short runs of sample slabs using some of the same apparatus used for production of full bricks.

It is a still further object of the invention to provide apparatus having the capability for production of slab samples having a wide variety of colors and textures.

It is another object of the invention to permit the rapid production of slab samples for use as decorative facings.

These and other features of the present invention will become evident from the detailed description set forth hereafter with reference to the accompanying drawings.

BRIEF DESCRIPTION OF DRAWINGS

A more complete understanding of the invention can be had by referring to the detailed description of the invention and the drawings in which.

DETAILED DESCRIPTION OF THE INVENTION

A detailed description of an apparatus and process for the production of brick slab samples is set forth below with reference to the figures. Although the invention will be described particularly with reference to rapid production of small quantities of slab samples, it will be understood that the invention is equally applicable in other contexts including, but not limited to, production of decorative brick facings of various thicknesses and quality control in the production of full size bricks.

Figure 1:
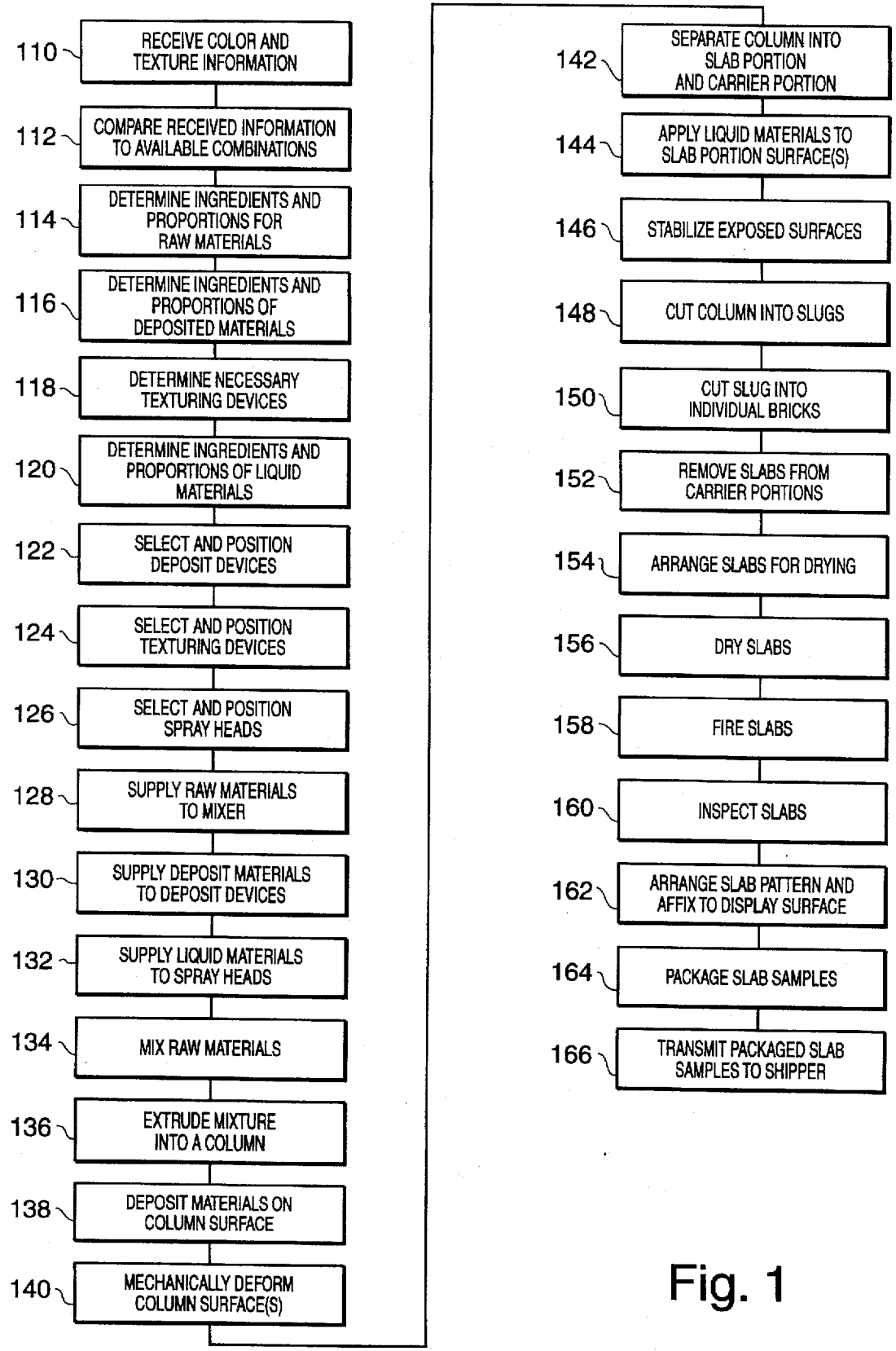
FIG. 1 is a flow diagram that illustrates a procedure for the rapid manufacture of brick slab samples according to one embodiment of the invention.

One embodiment of the invention is represented in the flow diagram shown in FIG. 1. At step 110, the color and texture information for the desired slab samples is received. The color information may comprise a wide variety of color characteristics, including selections from a spectrum of colors and hues, specified intensities of various colors, color mixtures ranging from monochromatic to polychromatic, reflective characteristics, such as glossy, flat, or matte finishes and other parameters which affect the appearance of color when viewed in various lighting conditions. Similarly, the texture information may identify a simple smooth-faced brick or the result of a combination of surfaces and textures. Texture information may include textures resulting from the deposit of various materials upon the surface or materials impressed into the surface, textures resulting from mechanical deformation of a surface of a brick while still in a raw or plastic state, or textures resulting from treatment of fired bricks.

After receipt of the color and texture information, at step 112 the information received is compared to reference information identifying permissible and available combinations of materials. This step allows for checking to see if the combination of color and texture information selected is in fact a feasible one to be produced within the time frame allowed for rapid production of the slab samples. This step also provides an opportunity to review the combination of the color and texture information parameters received to determine if problems with the particular combination are known or suspected.

At steps 114–120, the received information is used to determine the subsequent processing which is necessary to produce slab samples exhibiting the desired characteristics in the received information. Although represented in FIG. 1 as occurring sequentially, steps shown in FIG. 1 steps 114–120 may be performed in any order, or simultaneously. In step 114, the received information is used to determine the ingredients and proportions of the raw materials necessary to produce the raw mixture from which the slab samples are ultimately formed. At step 116, the deposited materials which are necessary to produce the desired slab samples, if any, are identified and the proportions of the ingredients are determined. At step 118 the necessary texturing devices are identified. These texturing devices may be means for mechanically deforming the surface, such as rollers, drags and other devices which impart force to the surface of the raw material. In some cases, such as when a weathered brick or used brick appearance is desired, the texturing devices may also include means for tumbling of the slab samples after the slab samples have been dried and fired. At step 120, the ingredients and respective proportions of liquid materials which are to be deposited on the surfaces of the slab samples are determined. When multiple types of liquid material are used, they may be applied in a variety of ways. The liquid materials may be combined to form a mixture prior to application, applied separately and mixed, spread across the surface of the slab sample or sequentially applied in layers as necessary to achieve a desired effect. Templates, stencils and screens may be used to produce patterns.

After the necessary ingredients, devices and proportions are determined, the necessary devices are physically selected and located with respect to the production line for the material in order to enable the application of materials or the deformation of the surface, as indicated in steps 122–126. Similar to steps 114–120 discussed above, the order in which the steps are performed is not critical and the steps may occur in various orders or simultaneously. In step 122 the devices for deposition of solid deposit materials are selected and positioned. In step 124 the texturing devices which are necessary are similarly selected and positioned. In step 126, the spray heads used for the application of liquid materials are selected and positioned. In step 128 the raw materials necessary to produce the basic raw mixture are supplied to a mixing apparatus. In step 130 the materials to be deposited are supplied to the deposit devices and in step 132 the liquid materials to be applied using the spray heads are supplied to the spray heads.

In step 134, the raw materials supplied in step 128 are mixed together. The resulting mixture is then extruded, step 136, into a column, which moves through subsequent processing apparatus. At step 138 the solid materials are deposited on a surface or surfaces of the column. While the order of the steps pertaining to deposit of solid material and texturing may be varied, it has been found that in many cases the deposition of solid material prior to the use of texturing devices is preferable, as this allows for the deposited materials to be affixed to the surfaces by the pressure subsequently imparted by the texturing devices. At step 140 the column surfaces are mechanically deformed by the texturing devices to result in the desired surface texture. After the surface texture is applied, at step 142 the column is separated into a slab portion and a carrier portion by passing through a cutting device which separates the upper slab portion of the column from the lower carrier portion of the column by a substantially horizontal cutting device. The lower carrier portion is retained to support the severed upper slab portion throughout part of the subsequent processing.

At step 144, the liquid materials are applied to the surface or surfaces of the slab portions using the spray heads. It will be appreciated that liquid materials may be deposited by various means other than spraying, such as flooding or dripping, in addition to spraying.

Following the application of the liquid materials, at step 146 the exposed surfaces of the slab portion and the carrier portion of the column are stabilized by use of a flash dryer which dries the exposed surfaces sufficiently to minimize deformation or damage to the surface which might otherwise be caused by later processing. Following stabilization of the exposed surfaces, the column is cut into slugs, 148. A slug is a section of the column which has a length which corresponds to the width of the cutting device which is used to form the individual bricks. Each slug is then cut into individual bricks, 150. Each individual "brick" at this stage is comprised of a slab portion and a carrier portion. At step 152, the slab portions are removed from the carrier portions and arranged for drying in step 154. Next, the slabs are dried, step 156, and fired, step 158. Although not indicated in FIG. 1, in some circumstances it may be necessary to further process the surfaces of the slabs after firing, such as by tumbling or other mechanical deformation, or by applying coatings or other materials to the surfaces of the fired slabs, in order to obtain the desired slab sample characteristics.

Next, at step 160, the fired slabs are inspected for consistency with reference information. The reference information may comprise representations of the selected color and texture information that was initially received and may also comprise comparison to reference samples. Although various optical sensing devices may be used to provide information with respect to the characteristics of the finished slab, and mechanical or electrical devices may similarly be used to detect and measure parameters of the finished slab having to do with shape, size, and texture, it has been found that with the current state of the optical sensors available, it is desirable to have a manual visual inspection of the produced samples in comparison to reference samples under controlled lighting and viewing conditions. The desirability of manual visual inspection is particularly pronounced in situations where the surface of the slab sample represents a variety of colors in an essentially random pattern. Following inspection, at step 162 the slabs are arranged in the desired pattern and affixed to a display surface, such as a board. While various means of affixation may be employed, conventional hot glue guns and the like are effective in rapidly producing mounted arrangements of slab samples.

Next, at step 164, the slab samples are packed for transport. Finally, at step 166, the package of slab samples are transmitted to the shipper for delivery to the customer. While the elapsed time for production of the slab samples is dependent on several factors, it has been found commercially advantageous to transmit the slab samples to a shipper for delivery at least within 72 hours of the receipt of the initial color and texture information, and preferably, within such shorter time periods as circumstances allow, such as 48 or 24 hours.

Figure 2:
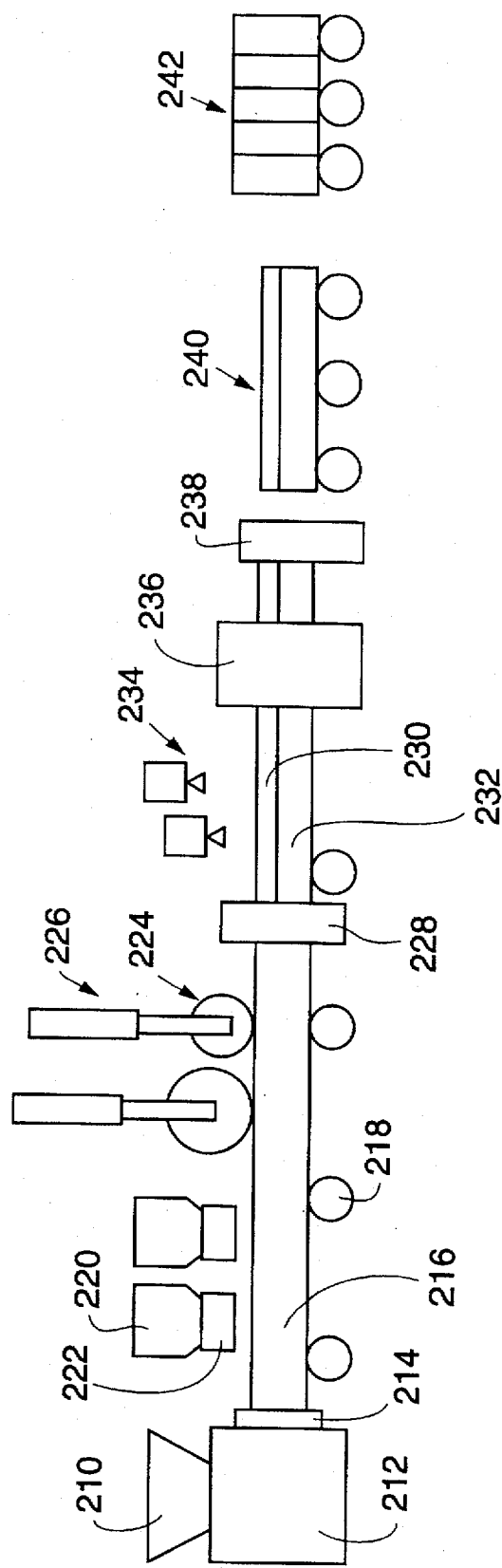
FIG. 2 is a schematic representation of a portion of an apparatus for producing brick slab samples.

A portion of an apparatus for the production of brick slab samples according to one embodiment of the invention is illustrated in FIG. 2. Referring to FIG. 2, after the composition and proportions of the desired raw materials are determined, the raw materials are transported to a pug mill 210 wherein the materials are mixed together. The mixture then flows into the extruder 212 which compresses the mixture and forces the mixture through an extrusion die 214, thus creating a column 216 having a rectangular cross-section. The column 216 is supported by column supports 218. Although the column supports 218 represented in FIG. 2 are shown as undriven rollers, it will be appreciated that various means of supporting the moving column 216 may be used, such as endless belts. In addition, while the force necessary to advance the column through the apparatus may be supplied solely by the extruder, it will be appreciated that additional force may be imparted to the column 216 to urge the column through the apparatus, using means such as power driven column supports or by aligning the apparatus to take advantage of the force of gravity.

One of the ways that the color and texture of a slab sample may be affected is by the deposition of solid materials, such as sand, on a surface of the extruded column. The solid materials deposited may affect the color of a surface of the slab sample due to variation in color from the extruded material, by chemical interaction with the extruded material or other materials applied to the surface, or by changing the color or light reflecting properties of the slab samples as a result of subsequent processing such as firing. The texture of the slab sample may be directly affected by the deposition of solid materials which are embedded in the surface. In addition, organic materials may be deposited on a surface of the extruded column and embedded in the surface. During firing of the slab samples, the organic material burns away, leaving voids and depressions in the surface of the fired brick.

In the embodiment of the invention illustrated in FIG. 2, the uppermost horizontal surface of the column 216 corresponds to the primary exposed surface of the finished slab sample. Accordingly, solid material hoppers 220 are positioned above the uppermost horizontal surface of the column 216, allowing the force of gravity to cause the solid material to flow from the hoppers 220 onto the surface of the column 216. The amount of solid material deposited, and the selection of which solid materials are deposited at a particular time may be controlled by deposit controllers 222. In one embodiment, the deposit controllers comprise means to vary the size of an aperture in the lower part of the hopper to regulate the flow of solid material through the aperture. In addition, while the embodiment illustrated in FIG. 2 uses a gravity feed, in alternative embodiments the solid materials may be urged towards the column by application of other types of force, such as those generated by pneumatic or mechanical devices. Such devices are particularly applicable in situations where it is desirable to apply a solid material to a vertical surface of the column.

In the embodiment depicted in FIG. 2, the solid material hoppers 220 are positioned between the extruder and the texturing rollers 224. While the arrangement shown has the possibility of using pressure from the texturing rollers to embed solid material deposited on the surface of the column into the column surface, it will be appreciated that solid material deposition means such as the solid material hoppers 220 and mechanical deformation means such as the texturing rollers may be arranged in a variety of locations relative to the column 216 if necessary to produce a desired type of sample slab.

The texturing rollers 224 are means to mechanically deform surfaces of the column to produce surface deviations, or texture. The rollers 224 are typically a cylindrical shape with protrusions affixed to the exterior surface of the cylinder, although various configurations may be used. The protrusions on different rollers may vary in form and shape, from geometric patterns to arbitrary designs. The rollers 224 are typically positioned such that the axis of the cylinder is perpendicular to the direction of travel of the column 216. Each roller 224 may be positioned to engage the column 216 by use of a roller actuator 226. When the roller is positioned to engage a moving column 216, the friction between the column and the roller surface causes the roller to rotate about its axis, which in turn causes the protrusions on the roller surface to correspondingly deform the surface of the column. While the actuator 226 may comprise a simple mechanical linkage, in a preferred embodiment a roller actuator 226 includes pneumatic or hydraulic means for positioning the roller, controlling the position of the roller with respect to the column the column and controlling the amount of pressure applied to the column by the roller. Variation in the position of the roller 224 and the pressure applied by the roller permits variation in the surface textures which may be formed using a single roller. The ability to selectively cause each roller 224 to engage and disengage the column 216 permits a large number of possible textures to be formed using a relatively small number of texturing rollers in various combinations. It should be noted that the diameter of a given texture roller determines the frequency with which a particular protuberance on the surface of the roller engages the surface of the column. As a result, simultaneous engagement of rollers having varying diameters may result in greater variation in the texture produced over a finite length of the column.

Although rollers are shown in the embodiment illustrated in FIG. 2, it will be appreciated that other means of mechanically texturing the surfaces of the column may be employed, such as drags which contact the surface or forming devices having an irregular surface which are positioned so as to intersect a surface of the column 216, resulting in deformation of the surface of the column or causing portions of the surface material to be removed from the column. Such other texturing means may be controlled by actuators similar to the roller actuators 226. In another embodiment, the texturing means may also be moved relative to the column while still engaged with the surface of the column if desired to produce a desired texture. For example, a texturing device similar to a comb would produce a wavy surface texture if the device was oscillated back and forth across a surface of a column while the column was moving in a direction perpendicular to the direction of the oscillating movement.

Figure 3:
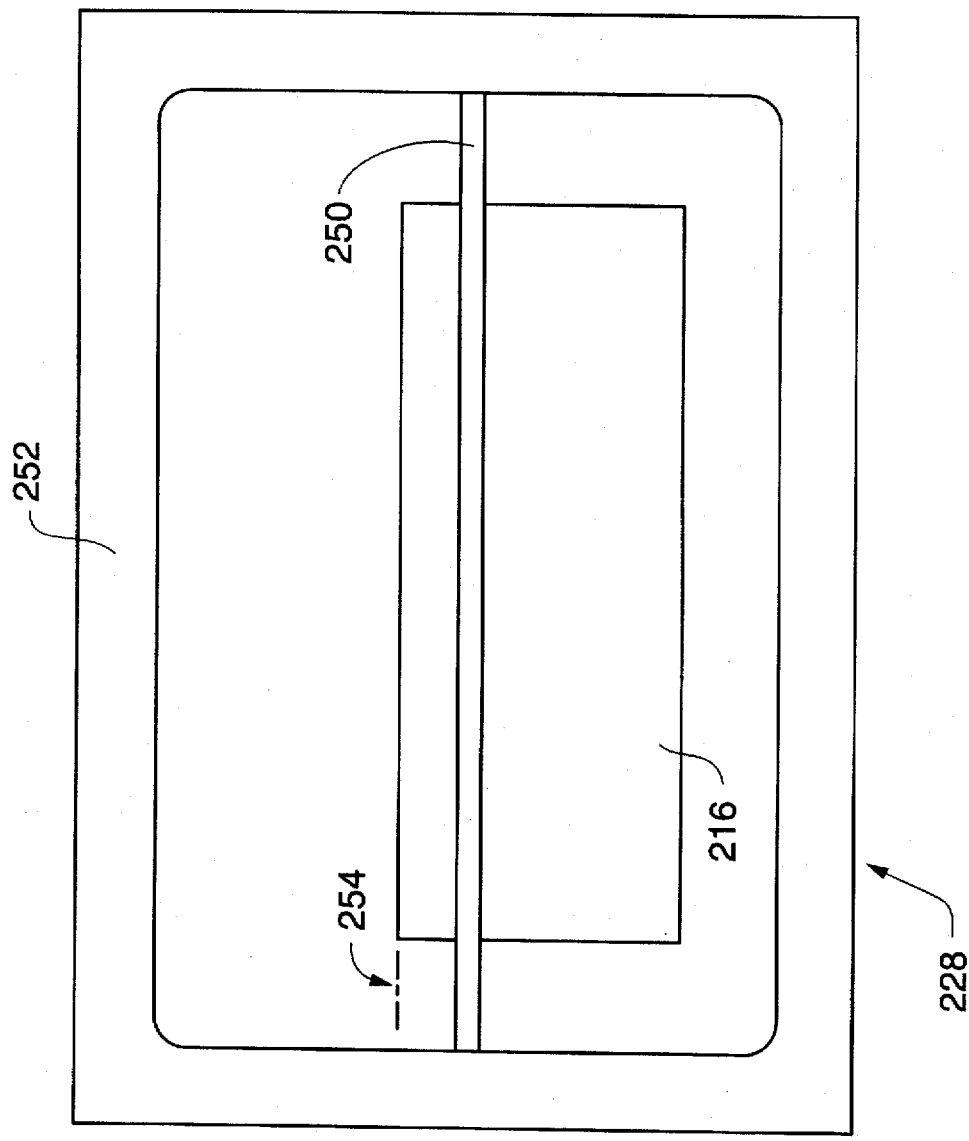
FIG. 3 is a cross section illustrating the placement of a slab cutter in relation to an extruded column.

The slab cutter 228 is the means by which depth of the brick slab samples are determined. Turning to FIG. 3, which shows a cross-section view of one embodiment of a slab cutter 238, a horizontal cutting wire 250 is connected to a frame 252 which extends outside the area of the cross-section of the column 216. The cutting wire 250 is positioned below the uppermost horizontal surface of the column 216 a distance sufficient to produce a sample slab of the desired thickness. While many thicknesses of slabs may be produced using the slab cutter, the cutting wire 250 is typically located approximately ½ to ¾ inch below the nominal uppermost horizontal surface represented by the nominal plane 254, although in some applications the location of the cutting wire 250 may be from about ⅛ inch to about 3 inches below the nominal plane 254. The nominal plane 254 represents an approximation of the horizontal plane establishing the uppermost surface of the column, exclusive of deviations caused by previous processing, such as the engagement of texturing rollers 224 as described above. It will be appreciated that the location of the cutting wire 250 will generally be constrained to be far enough below the nominal plane such that the wire does not intersect any depressions in the surface or any embedded material.

Although the slab cutter 238 illustrated in FIG. 3 includes a cutting wire 250, it will be appreciated that alternative means of cutting, such as a rigid blade, may be employed. In a further embodiment of the invention, means for applying a releasing agent to the cut surfaces is included. Application of such a releasing agent to the cut surfaces may be desired to facilitate later separation of the cut pieces. One such applying means would be a perforated tube of a diameter similar to that of the cutting wire 250, located between the cut surfaces and adjacent to the cutting wire 250 in substantially the same horizontal plane as the cutting wire. A liquid release agent may be applied to the cut surfaces through the perforations.

Referring again to FIG. 2, the slab cutter 228 separates the column 216 into a slab column portion 230 and a carrier column portion 232. As the slab column portion comprises the material from which the finished slabs are produced, the carrier column 232 portion could be discarded or diverted for reprocessing immediately after passing through the slab cutter. However, in the embodiment shown in FIG. 2, the carrier column portion 232 is retained though some of the subsequent processing. In one embodiment, retention of the carrier column portion 232 in conjunction with the slab column portion 230 yields a composite column having approximately the same cross section as solid columns used in the manufacture of full size brick, thus facilitating subsequent use of equipment designed to handle full size bricks. One advantage of the use of some of the same equipment to produce both full size bricks and slab samples is that production of full size bricks which are consistent in composition and appearance with that of the slab samples is facilitated, thus allowing quality control.

In another embodiment of the invention, the height of the column may be sufficiently thick that the carrier column portion 230 is of a size suitable for use as a full size brick after the slab column portion has been cut, allowing the simultaneous production of both full size brick and sample slabs. Similarly, adjustment of the slab cutter 238 and/or control of the height of the column may be used to produce carrier portions of various sizes as may be needed. After cutting, carrier portions may be subsequently coated, textured and otherwise treated.

A further aspect of the present invention is the ability to rapidly convert from manufacture of full size brick to the production of slab samples and back. If full size brick is in production when it is desired to change to the production of slab samples, the production run may need to be interrupted to change the materials and devices to those required by the slab samples. Prior to discontinuation of production of full size bricks, the parameters which affect the composition and appearance, such as color and texture information, of the full size bricks may be recorded. The recorded parameters may then be used to rapidly re-establish the necessary conditions for the production of the full size brick. Generally, the interruption may require the cleaning of the pug mill 210, extruder 212, extrusion die 214, material hoppers 226, deposit controllers 222 and spray heads 234 along with other parts of the apparatus if the parameters of the slab sample are different from the full size brick. If the raw material in use for the full size brick is the same as required for the slab samples, cleaning of the pug mill 210, extruder 212 and extrusion die 214 would not be required. Also, the need to clean devices such as the spray heads 234 and the material hoppers 225 may be avoided by the provision of sufficient devices to separately accommodate all the materials necessary for both the full size brick and the slab samples. If sufficient devices are provided to accommodate the requirements of production of both slab samples and full size bricks simultaneously, the time required to change from production of one type of brick to the other may be reduced by preparation of such devices prior to interruption of production. When the production of slab samples has ended, the apparatus may be returned to production of full size bricks after similar cleaning, if necessary. In addition, the parameters which affect the composition and appearance of the slab samples may be recorded. The recorded parameters may then be used to rapidly re-establish the necessary conditions for the production of additional slab samples and may also be used to establish the parameters for full size brick having the same composition and appearance.

With further reference to FIG. 2, the spray heads 234 are used to apply liquid materials to surfaces of the slab column portion 230. Such liquid materials may comprise a wide variety of substances, including paint, stains, glazes and other materials. Spray heads 234 may also be used to apply semi-liquid or powdered materials. Although the embodiment depicted in FIG. 2 generally depicts multiple spray heads positioned approximately perpendicular to the top surface of the slab column portion 230, it will be appreciated that single or multiple spray heads may be used, and each head may be positioned as desired relative to the slab column portion 230 to achieve a desired spray pattern. Spray heads may also be positioned to apply materials to the carrier column portion 232 if desired. In one embodiment, sweeps and/or drags which contact the sprayed material after application may be positioned to spread or mix the sprayed material across a surface of the slab column portion 230.

After the application of sprayed materials, if any, using the spray heads 234, the exposed surfaces of the slab column portion 230 are stabilized by exposure to the flash dryer 236. In contrast to the drying of fully formed brick prior to firing, the flash dryer 236 is intended to stabilize the exposed surfaces of the slab column portion 230 to minimize the adverse effects upon the ultimate appearance of the finished slab sample which might be generated by subsequent processing. For example, in one embodiment, the slab column portion and the carrier column portion are cut into slugs 240 by a slug cutter 238. Subsequently, a plurality of the slugs are stacked side by side and force is applied to the side of one of the slugs to force the stacked slugs though a wire cutter 242. If the material comprising the slab column portion 230 is pliable, or liquid materials applied to the surface of the slab column portion are still wet, when the slugs 240 are stacked or forced through the cutter, the contact with other slugs or application of force may result in the surfaces of the slab column portion being deformed into a shape inconsistent with the texture imparted by the texturing rollers 224 or cause the liquid materials on the surface to be redistributed on the surface. Accordingly, the flash dryer 236 dries the surfaces of the slab column portion 230 and the materials applied to said surfaces to a sufficient degree that the effects of subsequent processing are minimized. The flash dryer 236 may comprise a variety of drying means, including circulated airflow, convection heating, radiant heating or microwave heating.

After exposure to the flash dryer 236, the slab column portions and the carrier column portions are cut into slugs 240 by a slug cutter 238. As discussed above, the slugs are then forced though a wire cutter 242 to produce individual slab portions having the desired height and width and corresponding carrier portions. The individual slab portions, or sample slabs, are then separated from their corresponding carrier portions and arranged for drying. The carrier portions may be discarded or, preferably, diverted for further processing or recycling. The separation of the slab samples from the carrier portions assists in the rapid production of slab samples by reducing the time necessary to dry and fire the slab samples. Production of slab samples by sawing completed full bricks to sample size requires the production of completed full bricks. Full bricks may typically take five days to dry and fire. In contrast, the slab samples formed by the present invention contain less material, reducing drying and firing time to the point where completed slab samples may be shipped within 72 hours after the receipt of the sufficient information to produce the samples. More preferably, completed slab samples using the present invention may shipped with in 48 hours and even more preferably within 24 hours.

Although a conventional brick kiln may be used to fire the slab samples, in one embodiment a tile kiln is used for firing. A tile kiln typically is adapted for handling of relatively thin materials and also permits rapid operation. Use of a separate tile kiln to fire slab samples also minimizes the potential for disruption of the production of full size brick which might result from introducing slab samples having a much shorter firing time into a conventional brick kiln where full size bricks are being fired. Various other types of kilns may also be used, such as small pottery kilns and the like.

Figure 4:
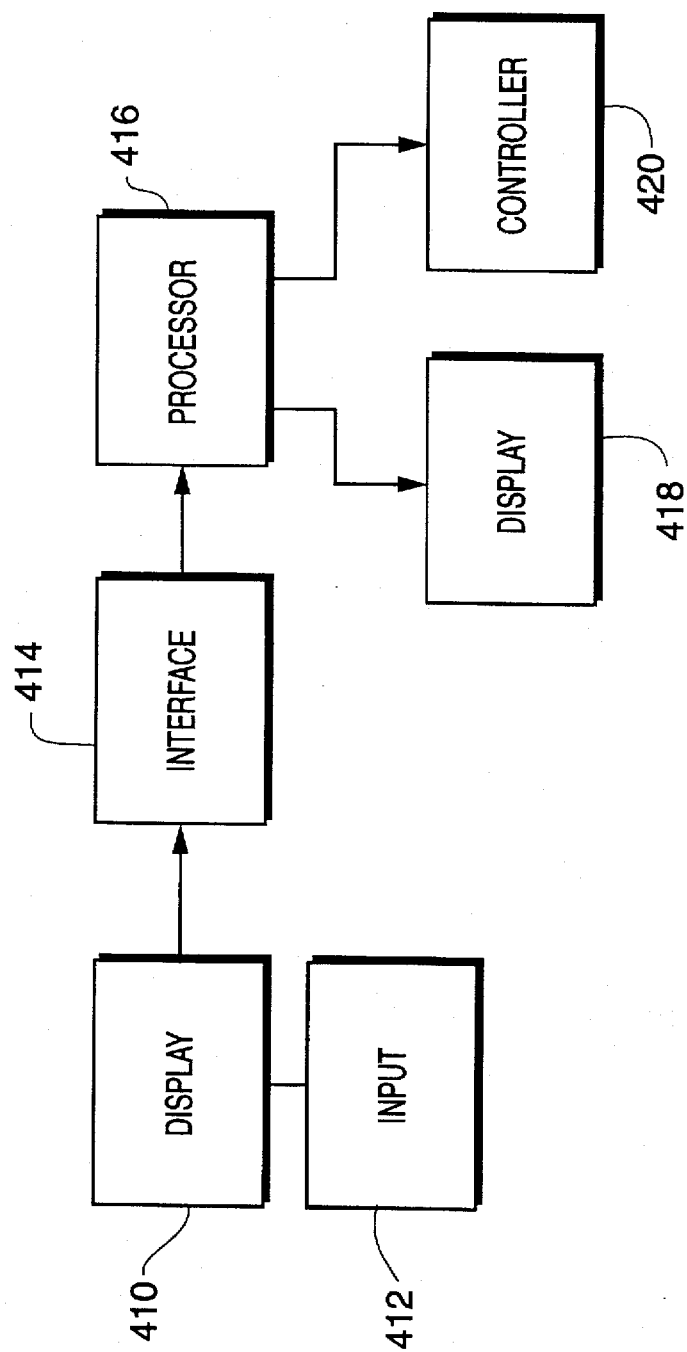
FIG. 4 is a block diagram illustrating the components of an integrated apparatus for selecting slab parameters.

In another embodiment of the invention, a computer based system which allows a user to view and select various color and texture parameters to be used in the production of slab samples may be employed. FIG. 4 illustrates the primary components of such a system. A display device 410 is used to display the color and texture choices. Preferably, the display comprises a high resolution color monitor. The color and texture information is displayed in a manner which allows a customer to selectively view available colors and available textures, as well as to display the results of selected variations in the intensity of colors, the reflective characteristics of colors, the hue of colors, and other parameters affecting the visual perception of a brick. Similarly, the display device 410 is preferably capable of displaying representations of various textures and surface treatments which may be produced in slab samples. The display device is operatively connected to an input device 412 which permits the user to control the displayed information and select desired combinations of color information and texture information. The input device may comprise conventional input devices such as a computer keyboard, a mouse, a track ball, a light pen, touch screens and similar input devices. The display device 410 and the input device 412 may be integrated, as in the case of a personal computer.

After the user has viewed and selected the desired combination of information for the desired parameters of the slab samples to be produced, the information is communicated to and received by an interface 414 which is connected to a processor 416. The information received by the interface 414 is communicated to the processor 416 where the selected information may be checked to determine if the combination of parameters selected is available and suitable for production of slab samples. The processor 416 may also determine the ingredients, proportion and volume of ingredients which are necessary to produce slab samples having the desired characteristics as well as identifying the spray devices, texturing devices, deposit devices and other apparatus which may need to be employed to produce slab samples having the desired characteristics. The processor 416 may then communicate information to a display 418 as may be necessary to permit subsequent control of the processing or to initiate production of the desired slab samples by displaying ingredient lists and proportions or instructions. The processor 416 may also be operatively connected to a controller 420 which may receive information from the processor 416 allowing the automated selection of the necessary spray devices, texturing devices, deposit devices and other devices necessary to produce the desired slab samples. It should be appreciated that such a process and apparatus may also be used in the production of full size brick.

Thus, a process and apparatus for slab sampling of customized brick is provided which possesses several features and advantages. Initially, it should be noted that although several embodiments of the invention were described with reference to particular types of brick production devices, in alternative embodiments other devices having similar functions may be employed, thereby allowing the process to be used in a variety of existing production facilities.

Second, the use of some apparatus used in the production of full size brick facilitates rapid change from production of full size brick to slab samples in a production environment.

Third, the invention allows slab samples to be produced more rapidly than full size bricks, enabling better response to customer requests and timely supply of representative slab samples to customers engaged in making design decisions.

Further, and among other advantages, the process may be implemented by the use of an apparatus which allows a user at a location remote from the site of slab sample production to view and select desired parameters of bricks without the necessity of maintaining a supply of actual samples illustrating all possible color and texture combinations.

Although the invention has been described in detail, it should be understood that various changes, substitutions and alterations can be made herein without departing from the spirit and scope of the invention as defined by the appended claims.

What is claimed is:

1. A process for rapid production of customized brick slab samples, said process comprising the steps of:
   (a) receiving transmitted color and texture information;
   (b) preparing a mixture of material suitable for producing a brick slab sample using said color information;
   (c) forming a slab product from said mixture using such texture information said forming step comprising the steps of extruding a column comprising said mixture and separating said column into a slab product and a carrier portion supporting said slab product using cutting means;
   (d) firing said slab product; and
   (e) transmitting said slab product within 72 hours of receipt of said information.

2. A process as claimed in claim 1, wherein said transmitted color information comprises spectrum information and intensity information.

3. A process as claimed in claim 1, further comprising comparing said transmitted color information to reference information.

4. A process as claimed in claim 1, wherein said transmitted texture information relates to one of a plurality of texture selection options.

5. A process as claimed in claim 1, wherein said preparing step comprises the steps of:
   (i) determining ingredients and proportions of said ingredients capable of producing a slab having a color consistent with said color information; and
   (ii) mixing said ingredients in said proportions.

6. A process as claimed in claim 1, wherein said forming step comprises the step of:
   (i) selecting a forming means capable of producing a slab having a texture consistent with the texture information.

7. A process as claimed in claim 6, wherein said forming step further comprises the steps of:
   (i) extruding a column comprising said mixture; and
   (ii) positioning said forming means relative to said extruded column.

8. A process as claimed in claim 1, wherein said cutting means comprises a substantially horizontal wire.

9. A process as claimed in claim 1, further comprising applying of at least a first material to a surface of said slab product.

10. A process as claimed in claim 1, further comprising drying at least a first surface of said slab product.

11. A process as claimed in claim 1, further comprising treating at least a first surface of said slab product to alter the appearance of said slab product.

12. A process as claimed in claim 1, further comprising assembling a plurality of said slab products into a pattern prior to said transmitting step.

13. A process as claimed in claim 1, further comprising inspecting said slab product for consistency with said transmitted color and texture information.

14. A process for rapid production of customized brick slab samples, said process comprising the steps of:
   (a) receiving transmitted color and texture information;
   (b) determining ingredients and proportions of said ingredients capable of producing at least a first slab product having a color consistent with said color information;
   (c) mixing said ingredients to produce a raw mixture;
   (d) compressing said raw mixture using a compression means, said compressing step comprising extruding said raw mixture into a column;
   (e) forming a slab product from said raw mixture using forming means, said forming step comprising separating said slab product from said column along a substantially horizontal axis;
   (f) drying said slab product;
   (g) firing said slab product; and
   (h) packaging said slab product for transmittal within 72 hours of receipt of said information.

15. A process as claimed in claim 14, wherein said forming step comprises texturing at least a first surface of said slab product using a texturing means to produce a slab consistent with said texture information.

16. A process as claimed in claim 14, wherein a plurality of slab products are formed from said raw mixture.

17. An apparatus for rapid production of customized brick slab samples, comprising:
   (a) interface means for receiving slab parameter information;
   (b) processing means for using said slab parameter information to determine ingredients and ingredient proportions;
   (c) mixing means for mixing ingredients to produce a raw mixture; extruding means for extruding said raw mixture into a column
   (d) forming means for forming said raw mixture into a slab product, said forming means comprising cutting means for separating said slab product from said column along a substantially horizontal axis; and
   (e) firing means for firing said slab product.

18. An apparatus as claimed in claim 17, wherein said slab parameter information comprises color and texture information.

19. An apparatus as claimed in claim 17, further comprising:

(i) display means for displaying slab parameter information; and (ii) selection means allowing selection of slab parameter information.

20. An apparatus as claimed in claim 17, wherein said forming means further comprises texturing means for texturing at least a first surface of said slab product.

21. A process for rapidly changing types of brick production, said process comprising the steps of:

(a) forming a first brick type using first parameter information;

(b) recording said first parameter information;

(c) receiving color and texture information relating to a second brick type which is different from said first brick type;

(d) selecting forming means capable of producing brick having a texture consistent with the texture information relating to the second brick type;

(e) discontinuing the forming of said first brick type; and (f) forming the second brick type using said forming means, said forming step comprising the separation of a slab product from an extruded column.

22. A process as claimed in claim 21, wherein said second brick type comprises a slab product.

23. A process as claimed in claim 21, further comprising the step of recording said color and texture information.

* * * * *